United States Patent
Keller

(10) Patent No.: US 7,453,460 B2
(45) Date of Patent: *Nov. 18, 2008

(54) SYSTEM AND METHOD FOR GENERATING PIXEL VALUES FOR PIXELS IN AN IMAGE USING STRICTLY DETERMINISTIC METHODOLOGIES FOR GENERATING SAMPLE POINTS

(75) Inventor: Alexander Keller, Ulm (DE)

(73) Assignee: Mental Images GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/548,124

(22) Filed: Oct. 10, 2006

(65) Prior Publication Data

US 2007/0273690 A1   Nov. 29, 2007

Related U.S. Application Data

(63) Continuation of application No. 09/884,861, filed on Jun. 19, 2001, now Pat. No. 7,227,547.

(60) Provisional application No. 60/265,934, filed on Feb. 1, 2001, provisional application No. 60/212,286, filed on Jun. 19, 2000.

(51) Int. Cl.
  *G06T 15/50* (2006.01)
  *G06F 1/02* (2006.01)
(52) U.S. Cl. .................................. 345/426; 708/250
(58) Field of Classification Search ........................ None
  See application file for complete search history.

(56) References Cited

U.S. PATENT DOCUMENTS

| 4,897,806 | A | * | 1/1990 | Cook et al. | ............... 345/426 |
| 5,025,400 | A | * | 6/1991 | Cook et al. | ............... 345/611 |
| 5,790,442 | A | * | 8/1998 | Ninomiya et al. | ........... 708/444 |

(Continued)

FOREIGN PATENT DOCUMENTS

WO    9859322    12/1998

OTHER PUBLICATIONS

Robert L. Cook, "Stochastic Sampling in Computer Graphics," Jan. 1986, ACM Transactions on Graphics (TOG), vol. 5, No. 1, p. 51-72.*

(Continued)

*Primary Examiner*—Kee M. Tung
*Assistant Examiner*—Jason M Repko
(74) *Attorney, Agent, or Firm*—Jacobs & Kim LLP; David Jacobs

(57) ABSTRACT

A computer graphics system generates a pixel value for a pixel in an image, the pixel being representative of a point in a scene as recorded on an image plane of a simulated camera. The computer graphics system comprises a sample point generator and a function evaluator. The sample point generator is configured to generate a set of sample points representing at least one simulated element of the simulated camera, the sample points representing elements of, illustratively, for sample points on the image plane, during time intervals during which the shutter is open, and on the lens, a Hammersley sequence, and, for use in global illumination, a scrambled Halton sequence. The function evaluator is configured to generate at least one value representing an evaluation of a selected function at sample points generated by the sample point generator, those values corresponding to the pixel value.

6 Claims, 2 Drawing Sheets

---

GENERATE SET OF SAMPLE POINTS REPRESENTING AT LEAST ONE SIMULATED ELEMENT OF SIMULATED CAMERA, SAMPLE POINTS REPRESENTING ELEMENTS OF A HAMMERSLEY SEQUENCE, 201

- INCLUDES GENERATING SAMPLE POSITION POINTS $x_i$ REPRESENTING JITTERED SAMPLE POINT POSITIONS ON SUBPIXEL GRID FOR AT LEAST ONE PIXEL ON IMAGE PLANE;
- INCLUDES GENERATING SAMPLE POSITION POINTS IN ACCORDANCE WITH $$x_i = (s_x + \Phi_2(k), s_y + \Phi_3(j))$$

$$= \left(s_x + \frac{\sigma(k)}{2^n}, s_y + \frac{\sigma(j)}{2^n}\right)$$

- INCLUDES GENERATING, FOR AT LEAST ONE SAMPLE POINT POSITION ON A SUBPIXEL FOR AT LEAST ONE PIXEL ON THE IMAGE PLANE, SAMPLE TIME POINTS $T_{i,j}$ REPRESENTING "J" POINTS IN TIME DURING TIME INTERVAL DURING WHICH SIMULATED SHUTTER IS TO BE OPEN

GENERATE AT LEAST ONE VALUE REPRESENTING AN EVALUATION OF SAID SELECTED FUNCTION AT ONE OF THE SAMPLE POINTS, 202

- VALUE GENERATED BY THE FUNCTION EVALUATOR CORRESPONDS TO PIXEL VALUE

U.S. PATENT DOCUMENTS

| | | | | |
|---|---|---|---|---|
| 5,940,810 | A | * | 8/1999 | Traub et al. ............... 705/36 R |
| 6,028,606 | A | * | 2/2000 | Kolb et al. ................. 345/419 |
| 6,370,270 | B1 | * | 4/2002 | Nair et al. .................. 382/209 |
| 6,529,193 | B1 | * | 3/2003 | Herken et al. ............... 345/426 |
| 7,167,175 | B2 | * | 1/2007 | Keller ........................ 345/426 |
| 7,227,547 | B2 | * | 6/2007 | Keller ........................ 345/426 |

OTHER PUBLICATIONS

Tien-Tsin Wong, Wai-Shing Luk, Pheng-Ann Heng, "Sampling with Hammersley and Halton Points", 1997, Journal of Graphics Tools, vol. 2, No. 2, pp. 9-24.*

Andrew Keller, "Instant Radiosity," Aug. 3, 1997, Computer Graphics Proceedings, SIGGRAPH 97, p. 49-56.*

IBM Technical Disclosure Bulletin, "Quasi-Monte Carlo Rendering With Adaptive Sampling," vol. 39, No. 9, Sep. 1, 1996, pp. 215-224.

K. Sung, et al., "Design and Implementation of the Maya Renderer," Computer Graphics And Applications, 1998, Pacific Graphics '98, Sixth Pacific Conf., Singapore, Oct. 26-29, 1998, IEEE Comp. Soc. Oct. 26, 1998, pp. 150-159, 231.

* cited by examiner

GENERATE SET OF SAMPLE POINTS REPRESENTING AT LEAST ONE SIMULATED ELEMENT OF SIMULATED CAMERA, SAMPLE POINTS REPRESENTING ELEMENTS OF A HAMMERSLEY SEQUENCE, 201

- INCLUDES GENERATING SAMPLE POSITION POINTS $X_i$ REPRESENTING JITTERED SAMPLE POINT POSITIONS ON SUBPIXEL GRID FOR AT LEAST ONE PIXEL ON IMAGE PLANE;
- INCLUDES GENERATING SAMPLE POSITION POINTS IN ACCORDANCE WITH $$x_i = \left(s_x + \Phi_2(k), s_y + \Phi_2(j)\right)$$
$$= \left(s_x + \frac{\sigma(k)}{2^n}, s_y + \frac{\sigma(j)}{2^n}\right)$$

- INCLUDES GENERATING, FOR AT LEAST ONE SAMPLE POINT POSITION ON A SUBPIXEL FOR AT LEAST ONE PIXEL ON THE IMAGE PLANE, SAMPLE TIME POINTS $T_{i,j}$ REPRESENTING "J" POINTS IN TIME DURING TIME INTERVAL DURING WHICH SIMULATED SHUTTER IS TO BE OPEN

GENERATE AT LEAST ONE VALUE REPRESENTING AN EVALUATION OF SAID SELECTED FUNCTION AT ONE OF THE SAMPLE POINTS, 202

- VALUE GENERATED BY THE FUNCTION EVALUATOR CORRESPONDS TO PIXEL VALUE

FIG. 2

SYSTEM AND METHOD FOR GENERATING PIXEL VALUES FOR PIXELS IN AN IMAGE USING STRICTLY DETERMINISTIC METHODOLOGIES FOR GENERATING SAMPLE POINTS

CROSS-REFERENCE TO RELATED APPLICATIONS

This application for patent is a Continuation of U.S. patent application Ser. No. 09/884,861 filed Jun. 19, 2001 (issued as U.S. Pat. No. 7,227,547) which in turn claims the benefit of U.S. Provisional Patent Apps. Ser. Nos. 60/212,286 filed Jun. 19, 2000 and 60/265,934 filed Feb. 1, 2001 (both expired). This application also incorporates by reference herein U.S. patent application Ser. No. 08/880,418, filed Jun. 23, 1997 (issued as U.S. Pat. No. 6,529,193), Martin Grabenstein, et al., entitled "System And Method For Generating Pixel Values For Pixels In An Image Using Suicily Deterministic Methodologies For Generating Sample Points, (herein after "Grabenstein application"). "

FIELD OF THE INVENTION

The invention relates generally to the field of computer graphics, and more, particularly to systems and methods for generating pixel values for pixels in the image.

BACKGROUND OF THE INVENTION

In computer graphics, a computer is used to generate digital data that represents the projection of surfaces of objects in, for example, a three-dimensional scene, illuminated by, one or more light sources, onto a two-dimensional image plane, to simulate the recording of the scene by, for example, a camera. The camera may include a lens four projecting the image of the scene onto the image plane, or it may comprise a pinhole camera in which case no lens is used. The two-dimensional image is in the form of an array of picture elements (which are variable termed "pixels" or "pels"), and the digital data generated for each pixel represents the color and luminance of the scene as projected onto the image plane at the point of the respective pixel in the image plane. The surfaces the objects may have any of a number of characteristics, including shape, color, specularity, texture, and so forth, which are preferably rendered in the image as closely as possible, to provide a realistic-looking image.

Generally, the contributions of the light reflected from the various points in the scene to the pixel value representing the color and intensity of a particular pixel are expressed in the form of the one or more integrals of relatively complicated functions. Since the integrals used in computer graphics generally will not have a closed-form solution, numerical methods must be used to evaluate them and thereby generate the pixel value. Typically, a conventional "Monte Carlo" method has been used in computer graphics to numerically evaluate the integrals. Generally, in the Monte Carlo method, to evaluate an integral $$\langle f \rangle = \int_0^1 f(x)\,dx \tag{1}$$

where f(x) is a real function on the real numerical interval from zero to 1, inclusive, first a number "N" statistically-independent random numbers xi, i=1, . . . , N, are generated over the interval. The random numbers xi are used as sample points for which sample values f(xi) are generated for the function f(x), and an estimate $\bar{f}$ for the integral is generated as $$\langle f \rangle \approx \bar{f} = \frac{1}{N}\sum_{i=1}^{N} f(x_i) \tag{2}$$

As the number of random numbers used in generating the sample points f(xi) increases, the value of the estimate $\bar{f}$ will converge toward the actual value of the integral ⟨f⟩. Generally, the distribution of estimate values that will be generated for various values of "N," that is, for various numbers of samples, of being normal distributed around the actual value with a standard deviation σ which can be estimated by $$\sigma = \sqrt{\frac{1}{N-1}\left(\overline{f^2} - \bar{f}^2\right)} \tag{3}$$

if the values $x_i$ used to generate the sample values $f(x_i)$ are statistically independent, that is, if the values $x_i$ are truly generated at random.

Generally, it has been believed that random methodologies like the Monte Carlo method are necessary to ensure that undesirable artifacts, such as Moiré patterns and aliasing and the like, which are not in the scene, will not be generated in the generated image. However, several problems arise from use of the Monte Carlo method in computer graphics. First, since the sample points $x_i$ used in the Monte Carlo method are randomly distributed, they may clump in various regions over the interval over which the integral is to be evaluated. Accordingly, depending on the set of random numbers which are generated, in the Monte Carlo method for significant portions of the interval there may be no sample points $x_i$ for which sample values $f(x_i)$ are generated. In that case, the error can become quite large. In the context of generating a pixel value in computer graphics, the pixel value that is actually generated using the Monte Carlo method may not reflect some elements which might otherwise be reflected if the sample points $x_i$ were guaranteed to be more evenly distributed over the interval. This problem can be alleviated somewhat by dividing the interval into a plurality of sub-intervals, but it is generally difficult to determine a priori the number of sub-intervals into which the interval should be divided, and, in addition, in a multi-dimensional integration region (which would actually be used in computer graphics, instead of the one-dimensional interval described here) the partitioning of the region into sub-regions of equal size can be quite complicated.

In addition, since the method makes use of random numbers, the error |$\bar{f}$−⟨f⟩| (where |x| represents the absolute value of the value "x") between the estimate value $\bar{f}$ and actual value ⟨f⟩ is probabilistic, and, since the error values for various large values of "N" are close to normal distribution around the actual value ⟨f⟩, only sixty-eight percent of the estimate values $\bar{f}$ that might be generated are guaranteed to lie within one standard deviation of the actual value ⟨f⟩.

Furthermore, as is clear from equation (3), the standard deviation (y decreases with increasing numbers of samples N, proportional to the reciprocal of square root of "N" (that is, 1/√N). Thus, if it is desired to reduce the statistical error by a factor of two, it will be necessary to increase the number of samples N by a factor of four, which, in turn, increases the computational load that is required to generate the pixel values, for each of the numerous pixels in the image.

Additionally, since the Monte Carlo method requires random numbers, an efficient mechanism for generating random numbers is needed. Generally, digital computers are provided with so-called "random number" generators, which are computer programs which can be processed to generate a set of numbers that are approximately random. Since the random number generators use deterministic techniques, the numbers that are generated are not truly random. However, the property that subsequent random numbers from a random number generator are statistically independent should be maintained by deterministic implementations of pseudo-random numbers on a computer.

The Grabenstein application describes a computer graphics system and method for generating pixel values for pixels in an image using a strictly deterministic methodology for generating sample points, which avoids the above-described problems with the Monte Carlo method. The strictly deterministic methodology described in the Grabenstein application provides a low-discrepancy sample point sequence which ensures, a priori, that the sample points are generally more evenly distributed throughout the region over which the respective integrals are being evaluated. In one embodiment, the sample points that are used are based on a so-called Halton sequence. See, for example, J. H. Halton, *Numerische Mathematik*, Vol. 2, pp. 84-90 (1960) and W. H. Press, et al., Numerical Recipes in Fortran (2d Edition) page 300 (Cambridge University Press, 1992). In a Halton sequence generated for number base "p," where base "p" is a selected prime number, the "k-th" value of the sequence, represented by $H_p^k$ is generated by use of a "radical inverse" operation, that is, by (1) writing the value "k" as a numerical representation of the value in the selected base "p," thereby to provide a representation for the value as $D_M D_{M-1} \ldots D_2 D_1$, where $D_m$ (m=1, 2, ..., M) are the digits of the representation, (2) putting a radix point (corresponding to a decimal point for numbers written in base ten) at the least significant end of the representation $D_M D_{M-1} D_2 D_1$ written in step (1) above, and (3) reflecting the digits around the radix point to provide $0.D_1 D_2 \ldots D_{M-1} D_M$, which corresponds to $H_p^k$.

It will be appreciated that, regardless of the base "p" selected for the representation, for any series of values, one, two, ... "k," written in base "p," the least significant digits of the representation will change at a faster rate than the most significant digits. As a result, in the Halton sequence $H_p^1$, $H_p^2$, ... $H_p^k$, the most significant digits will change at the faster rate, so that the early values in the sequence will be generally widely distributed over the interval from zero to one, and later values in the sequence will fill in interstices among the earlier values in the sequence. Unlike the random or pseudo-random numbers used in the Monte Carlo method as described above, the values of the Halton sequence are not statistically independent; on the contrary, the values of the Halton sequence are strictly deterministic, "maximally avoiding" each other over the interval, and so they will not clump, whereas the random or pseudo-random numbers used in the Monte Carlo method may clump.

It will be appreciated that the Halton sequence as described above provides a sequence of values over the interval from zero to one, inclusive along a single dimension. A multi-dimensional Halton sequence can be generated in a similar manner, but using a different base for each dimension.

A generalized Halton sequence, of which the Halton sequence described above is a special case, is generated as follows. For each starting point along the numerical interval from zero to one, inclusive, a different Halton sequence is generated. Defining the pseudo-sum $x \oplus_p y$ for any x and y over the interval from zero to one, inclusive, for any integer "p" having a value greater than two, the pseudo-sum is formed by adding the digits representing "x" and "y" in reverse order, from the most-significant digit to the least-significant digit, and for each addition also adding in the carry generated from the sum of next more significant digits. Thus, if "x" in base "p" is represented by $0.X_1 X_2 \ldots X_{M-1} X_M$, where each "$X_m$" is a digit in base "p," and if "y" in base "p" is represented by $0.Y_1 Y_2 \ldots Y_{N-1} Y_N$, where each "$Y_n$" is a digit in base "p" (and where "M," the number of digits in the representation of "x" in base "p", and "N," the number of digits in the representation of "y" in base "p", may differ), then the pseudo-sum "z" is represented by $0.Z_1 Z_2 \ldots Z_{L-1} Z_L$, where each "$Z_l$" is a digit in base "p" given by $Z_l=(X_l+Y_l+C_l)$ mod p, where "mod" represents the modulo function, and $$C_l = \begin{cases} 1 & \text{for } X_{l-1} + Y_{l-1} + Z_{l-1} \geq p \\ 0 & \text{otherwise} \end{cases}$$

is a carry value from the "l-1st" digit position, with $C_1$ being set to zero.

Using the pseudo-sum function as described above, the generalized Halton sequence that is used in the system described in the Grabenstein application is generated as follows. If "p" is an integer, and $x_0$ is an arbitrary value on the interval from zero to one, inclusive, then the "p"-adic von Neumann-Kakutani transformation $T_p(x)$ is given by $$T_p(x) := x \oplus_p \frac{1}{p}, \qquad (4)$$

and the generalized Halton sequence $x_0, x_1, x_2, \ldots$ is defined recursively as $$x_{n+1} = T_p(x_n) \qquad (5)$$

From equations (4) and (5), it is clear that, for any value for "p," the generalized Halton sequence can provide that a different sequence will be generated for each starting value of "x," that is, for each $x_0$. It will be appreciated that the Halton sequence $H_p^k$ as described above is a special case of the generalized Halton sequence (equations (4) and (5)) for $x_0=0$.

The use of a strictly deterministic low-discrepancy sequence can provide a number of advantages over the random or pseudo-random numbers that are used in connection with the Monte Carlo technique. Unlike the random numbers used in connection with the Monte Carlo technique, the low discrepancy sequences ensure that the sample points are more evenly distributed over a respective region or time interval, thereby reducing error in the image which can result from clumping of such sample points which can occur in the Monte Carlo technique. That can facilitate the generation of images of improved quality when using the same number of sample points at the same computational cost as in the Monte Carlo technique.

SUMMARY OF THE INVENTION

The invention provides a new and improved computer graphics system and method for generating pixel values for pixels in the image using a strictly deterministic methodology for generating sample points for use in evaluating integrals defining aspects of the image.

In brief summary, the invention provides, in one aspect, a computer graphics system for generating a pixel value for a pixel in an image, the pixel being representative of a point in a scene as recorded on an image plane of a simulated camera. The computer graphics system comprises a sample point generator and a function evaluator. The sample point generator is configured to generate a set of sample points representing at least one simulated element of the simulated camera, the sample points representing elements of, illustratively, for sample points on the image plane, during time interval during which the shutter is open, and on the lens, a Hammersley sequence, and, for use in global illumination, a scrambled Halton sequence. The function evaluator configured to generate at least one value representing an evaluation of said selected function at one of the sample points generated by said sample point generator, the value generated by the function evaluator corresponding to the pixel value.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 is a flowchart illustrating an overall method in accord with the invention.

DETAILED DESCRIPTION OF AN ILLUSTRATIVE EMBODIMENT

Figure 1:
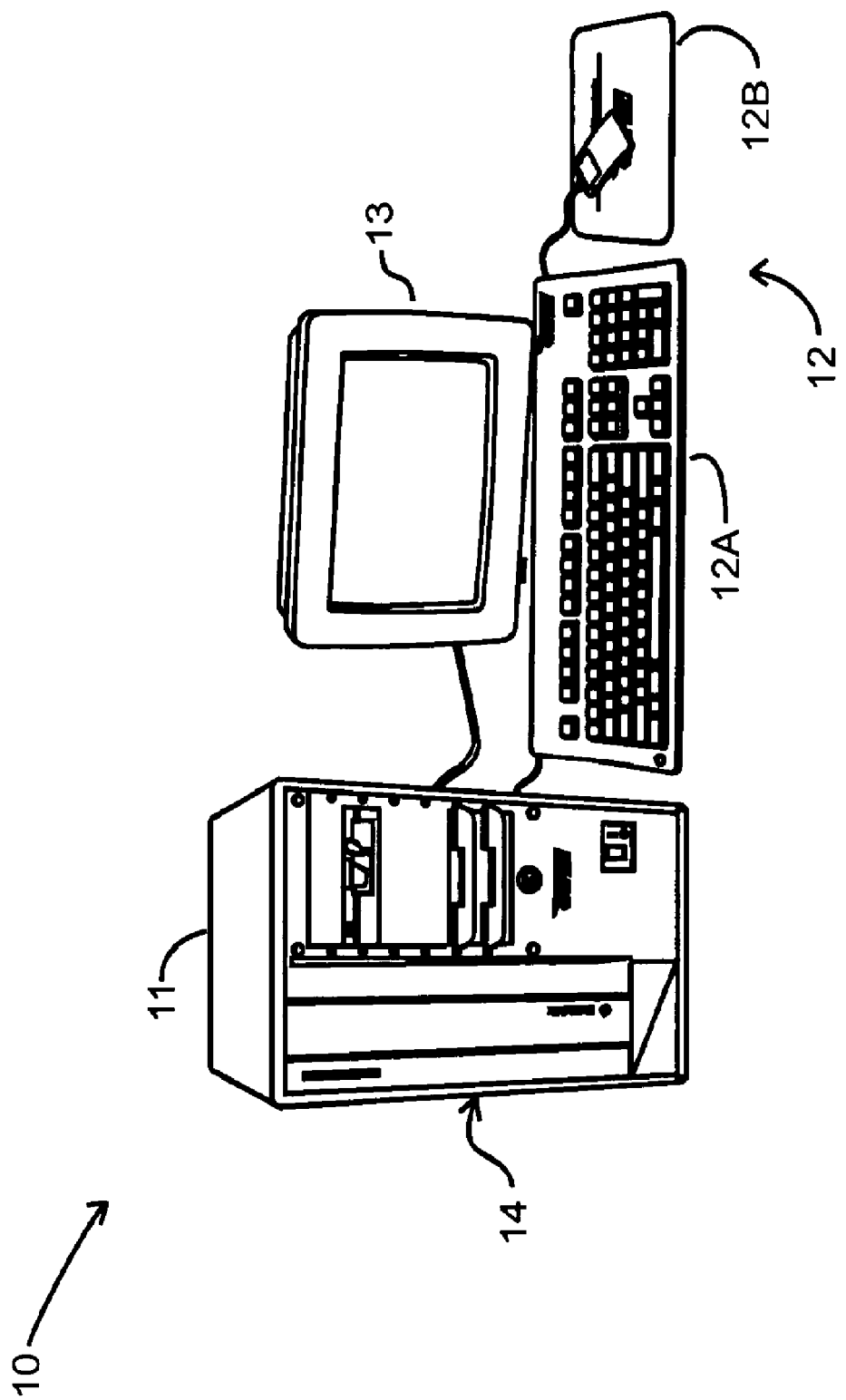
FIG. 1 depicts an illustrative computer graphics system constructed in accordance with the invention

The invention provides an computer graphic system and method for generating pixel values for pixels in an image of a scene, which makes use of a strictly-deterministic methodology for generating sample points for use in generating sample values for evaluating the integral or integrals whose function(s) represent the contributions of the light reflected from the various points in the scene to the respective pixel value, rather than the random or pseudo-random Monte Carlo methodology which has been used in the past. The strictly-deterministic methodology ensures a priori that the sample points will be generally more evenly distributed over the interval or region over which the integral(s) is (are) to be evaluated in a low-discrepancy manner.

FIG. 1 attached hereto depicts an illustrative computer system 10 that makes use of such a strictly deterministic methodology. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. Disk and/or tape storage elements are examples of computer-readable physical media on which computer programs and computer program products can be stored. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

It will be helpful to initially provide some background on operations performed by the computer graphics system in generating an image. Generally, the computer graphic system generates an image attempts to simulate an image of a scene that would be generated by a camera. The camera includes a shutter that will be open for a predetermined time T starting at a time to allow light from the scene to be directed to an image plane. The camera may also include a lens that serves to focus light from the scene onto the image plane. The average radiance flux $L_{m,n}$ through a pixel at position (m,n) on an image plane P, which represents the plane of the camera's recording medium, is determined by $$L_{m,n} = \frac{1}{|A_P| \cdot T \cdot |A_L|} \int_{A_P} \int_{t_0}^{t_0+T} \int_{A_L} L(h(x, t, y) - \omega(x, t, y)) f_{m,n}(x) \, dy \, dt \, dx \quad (6)$$

where "$A_P$" refers to the area of the pixel, $A_L$ refers to the area of the portion of the lens through which rays of light pass from the scene to the pixel, and $f_{m,n}$ represents a filtering kernel associated with the pixel. An examination of the integral in equation (6) will reveal that the variables of integration, "x," "y" and "t," are essentially dummy variables with the variable "y" referring to integration over the lens area ($A_L$), the variable "t" referring to integration over time (the time interval from $t_0$ to $t_0+T$) and the variable "x" referring to integration over the pixel area ($A_P$).

The value of the integral in equation (6) is approximated by identifying $N_P$ sample points $x_i$ in the pixel area, and, for each sample point, shooting $N_T$ rays at times $t_{i,j}$ in the time interval to $t_0+T$ through the focus into the scene, with each ray spanning NL sample points $y_{i,j,k}$ on the lens area $A_L$. The manner in which subpixel jitter positions $x_i$, points in time $t_{i,j}$ and positions on the lens $Y_{i,j,k}$ are determined will be described below. These three parameters determine the primary ray hitting the scene geometry in $h(x_i,t_{i,j},y_{i,j,k})$ with the ray direction $\omega(x_i,t_{i,j},y_{i,j,k})$. In this manner, the value of the integral in equation (6) can be approximated as $$L_{m,n} \approx \frac{1}{N} \sum_{i=0}^{N_P-1} \frac{1}{N_T} \sum_{j=0}^{N_T-1} \frac{1}{N_L} \sum_{k=0}^{N_L-1} L(h(x_i, t_{i,j}, y_{i,j,k}), - \omega(x_i, t_{i,j}, y_{i,j,k})) f_{m,n}(x_i), \quad (7)$$

where "N" is the total number of rays directed at the pixel.

It will be appreciated that rays directed from the scene toward the image can comprise rays directly from one or more light sources in the scene, as well as rays reflected off surfaces of objects in the scene. In addition, it will be appreciated that a ray that is reflected off a surface may have been directed to the surface directly from a light source, or a ray that was reflected off another surface. For a surface that reflects light rays, a reflection operator $T_{f_r}$ is defined that includes a diffuse portion $T_{f_d}$, a glossy portion $T_{f_g}$ and a specular portion $T_{f_s}$, or $$T_{f_r} = T_{f_d} + T_{f_g} + T_{f_s} \quad (8).$$

In that case, the Fredholm integral equation $L=L_e+T_{f_r}L$ governing light transport can be represented as $$L=L_e+T_{f_r-f_s}L_e+T_{f_s}(L-L_e)+T_{f_s}L+T_{f_d}T_{f_g+f_s}L+T_{f_d}T_{f_d}L \quad (9),$$

where transparency has been ignored for the sake of simplicity; transparency is treated in an analogous manner. The individual terms in equation (9) are (i) $L_e$ represents flux due to a light source;

(ii) $T_{f_r-f_s}L_e$ (where $T_{f_r-f_s}=T_{f_r}-T_{f_s}$) represents direct illumination, that is, flux reflected off a surface that was provided thereto directly by a light source; the specular component, associated with the specular portion $T_{f_s}$ of the reflection operator, will be treated separately since it is modeled as a δ-distribution;

(iii) $T_{f_g}(L-L_e)$ represents glossy illumination, which is handled by recursive distribution ray tracing, where, in the recursion, the source illumination has already been accounted for by the direct illumination (item (ii) above);

(iv) $T_{f_s}L$ represents a specular component, which is handled by recursively using "L" for the reflected ray;

(v) $T_{f_d}T_{f_g+f_s}L$ (where $T_{f_g+f_s}=T_{f_g}+T_{f_s}$) represents a caustic component, which is a ray that has been reflected off a glossy or specular surface (reference the $T_{f_g+f_s}$ operator) before hitting a diffuse surface (reference the $T_{f_d}$ operator); this contribution can be approximated by a high resolution caustic photon map; and (vi) $T_{f_d}T_{f_d}L$ represents ambient light, which is very smooth and is therefore approximated using a low resolution global photon map.

As noted above, the value integral (equation (6)) is approximated by solving equation (7) making use of sample points $x_i$, $t_{i,j}$ and $Y_{i,j,k}$, where "$x_i$" refers to sample points within area $A_L$ of the respective pixel at location (m,n) in the image plane, "$t_{i,j}$" refers to sample points within the time interval $t_0$ to $t_0+T$ during which the shutter is open, and "$y_{i,j,k}$" refers to sample points on the lens $A_L$. In accordance with one aspect of the invention, the sample points $x_i$ comprise two-dimensional Hammersley points, which are defined as $$\left(\frac{i}{N}, \Phi_2(i)\right),$$

where $0 \leq i < N := (2^n)^2$ for a selected integer parameter "n," and $\Phi_2(i)$ refers to the radical inverse of "i" in base "two." Generally, the "s" dimensional Hammersley point set is defined as $$U_{N,s}^{Hammersley} : \{0, ..., N-1\} \rightarrow I^s \quad (10)$$

$$i \mapsto x_i := \left(\frac{i}{N}, \Phi_{b_1}(i), ..., \Phi_{b_{s-1}}(i)\right),$$

where $I^s$ is the s-dimensional unit cube [0,1) (that is, an s-dimensional cube that includes "zero," and excludes "one"), the number of points "N" in the set is fixed and $b_1, ..., b_{s-1}$ are bases. The bases do not need to be prime numbers, but they are preferably relatively prime to provide a relatively uniform distribution. The radical inverse function $\Phi_b$, in turn, is generally defined as $$\Phi_b : N_0 \rightarrow I \quad (11)$$

$$i = \sum_{j=0}^{\infty} a_j(i) b^j \mapsto \sum_{j=0}^{\infty} a_j(i) b^{-j-1}$$

where $$(a_j)_{j=0}^{\infty}$$

is the representation of "i" in integer base "b." The two-dimensional Hammersley points form a stratified pattern on a $2^n$ by $2^n$ grid. Considering the grid as subpixels, the complete subpixel grid underlying the image plane can be filled by simply abutting copies of the grid to each other.

Given integer subpixel coordinates $(s_x, s_y)$ the instance "i" and coordinates (x,y) for the sample point $x_i$ in the image plane can be determined as follows. Preliminarily, examining $$\left(\frac{i}{N}, \Phi_2(i)\right)_{i=0}^{N-1},$$

one observes that (a) each line in the stratified pattern is a shifted copy of another, and (b) the pattern is symmetric to the line y=x, that is, each column is a shifted copy of another column.

Accordingly, given the integer permutation $\sigma(k):=2^n\Phi_2(k)$ for $0 \leq k < 2^n$, subpixel coordinates $(s_x, s_y)$ are mapped onto strata coordinates $(j,k):=s_x \mod 2^n, s_y \mod 2^n)$, an instance number "i" is computed as $$i = j2^n + \sigma(k) \quad (12)$$

and the positions of the jittered subpixel sample points are determined according to $$x_i = (s_x + \Phi_2(k), s_y + \Phi_2(j)) \quad (13)$$
$$= \left(s_x + \frac{\sigma(k)}{2^n}, s_y + \frac{\sigma(j)}{2^n}\right).$$

An efficient algorithm for generating the positions of the jittered subpixel sample points $x_i$ will be provided below in connection with Code Segment 1. A pattern of sample points whose positions are determined as described above in connection with equations (12) and (13) has an advantage of having much reduced discrepancy over a pattern determined using a Halton sequence or windowed Halton sequence, as described in the aforementioned Grabenstein application, and therefore the approximation described above in connection with equation (7) gives in general a better estimation to the value of the integral described above in connection with equation (6). In addition, if "n" is sufficiently large, sample points in adjacent pixels will have different patterns, reducing the likelihood that undesirable artifacts will be generated in the image.

A ray tree is a collection of paths of light rays that are traced from a point on the simulated camera's image plane into the scene. The computer graphics system 10 generates a ray tree by recursively following transmission, subsequent reflection and shadow rays using trajectory splitting. In accordance with another aspect of the invention, a path is determined by the components of one vector of a global generalized scrambled Hammersley point set. Generally, a scrambled Hammersley point set reduces or eliminates a problem that can arise in connection with higher-dimensional low-discrepancy sequences since the radical inverse function $\Phi_b$ typically has subsequences of b−1 equidistant values spaced by 1/b. Although these correlation patterns are merely noticeable in the full s-dimensional space, they are undesirable since they are prone to aliasing. The computer graphics system 10 attenuates this effect by scrambling, which corresponds to application of a permutation to the digits of the b-ary representation used in the radical inversion. For a permutation a from a symmetric group $S_b$ over integers 0, . . . ,b−1, the scrambled radical inverse is defined as $$\Phi_b : \mathbb{N}_0 \times S_b \to I \quad (14)$$

$$(i, \sigma) \mapsto \sum_{j=0}^{\infty} \sigma(a_j(i))b^{-j-1} \Leftrightarrow i = \sum_{j=0}^{\infty} a_j(i)b^j.$$

If the permutation "σ" is the identity, the scrambled radical inverse corresponds to the unscrambled radical inverse. In one embodiment, the computer graphics system generates the permutation a recursively as follows. Starting from the permutation $\sigma_2=(0,2)$ for base b=2, the sequence of permutations is defined as follows:

(i) if the base "b" is even, the permutation $\sigma_b$ is generated by first taking the values of $$2\sigma_{\frac{b}{2}}$$

and appending the values of $$2\sigma_{\frac{b}{2}} + 1,$$

and (ii) if the base "b" is odd, the permutation $\sigma_b$ is generated by taking the values of $\sigma_{b-1}$, incrementing each value that is greater than or equal $$\frac{b-1}{2}$$

by one, and inserting the value b−1 in the middle.

This recursive procedure results in $\sigma_2=(0,1)$
$\sigma_3=(0,1,2)$
$\sigma_4=(0,2,1,3)$
$\sigma_5=(0,3,2,1,4)$
$\sigma_6=(0,2,4,1,3,5)$
$\sigma_7=(0,2,5,3,1,4,6)$
$\sigma_8=(0,4,2,6,1,5,3,7)$. . .

The computer graphics system 10 can generate a generalized low-discrepancy point set as follows. It is possible to obtain a low-discrepancy sequence by taking any rational s-dimensional point "x" as a starting point and determine a successor by applying the corresponding incremental radical inverse function to the components of "x." The result is referred to as the generalized low-discrepancy point set. This can be applied to both the Halton sequence and the Hammersley sequence. In the case of the generalized Halton sequence, this can be formalized as $$x_i = (\Phi_{b_1}(i+i_1), \Phi_{b_1}(i+i_2), \ldots, \Phi(+i_s)) \quad (15),$$

where the integer vector $(i_1, i_2, \ldots, i_s)$ represents the offsets per component and is fixed in advance for a generalized sequence. The integer vector can be determined by applying the inverse of the radical inversion to the starting point "x." A generalized Hammersley sequence can be generated in an analogous manner.

Returning to trajectory splitting, generally trajectory splitting is the evaluation of a local integral, which is of small dimension and which makes the actual integrand smoother, which improves overall convergence. Applying replication, positions of low-discrepancy sample points are determined that can be used in evaluating the local integral. The low-discrepancy sample points are shifted by the corresponding elements of the global scrambled Hammersley point set. Since trajectory splitting can occur multiple times on the same level in the ray tree, branches of the ray tree are decorrelated in order to avoid artifacts, the decorrelation being accomplished by generalizing the global scrambled Hammersley point set.

An efficient algorithm for generating a ray tree will be provided below in connection with Code Segment 2. Generally, in that algorithm, the instance number "i" of the low-discrepancy vector, as determined above in connection with equation (12), and the number "d" of used components, which corresponds to the current integral dimension, are added to the data structure that is maintained for the respective ray in the ray tree. The ray tree of a subpixel sample is completely specified by the instance number "i." After the dimension has been set to "two," which determines the component of the global Hammersley point set that is to be used next, the primary ray is cast into the scene to span its ray tree. In determining the deterministic splitting by the components of low discrepancy sample points, the computer graphics system 10 initially allocates the required number of dimensions "$\Delta d$." For example, in simulating glossy scattering, the required number of dimensions will correspond to "two." Thereafter, the computer graphics system 10 generates scattering directions from the offset given by the scrambled radical inverses $\Phi_{b_d}(i, \sigma_{b_d}), \ldots, \Phi_{b_{d+\Delta d-1}}(i, \sigma_{b_{d+\Delta d-1}})$, yielding the instances $$(y_{i,j})_{j=0}^{M-1} = \left(\Phi_{b_d}(i, \sigma_{b_d}) \oplus \frac{j}{M}, \ldots, \Phi_{b_{d+\Delta d-1}}(i, \sigma_{b_{d+\Delta d-1}}) \oplus \Phi_{b_{d+\Delta d-2}}(i, \sigma_{b_{d+\Delta d-2}})\right), \quad (16)$$

where "$\oplus$" refers to addition modulo "one." Each direction of the "M" replicated rays is determined by $y_{i,j}$ and enters the next level of the ray tree with d':=d+$\Delta$d as the new integral dimension in order to use the next elements of the low-discrepancy vector, and i'=i+j in order to decorrelate subsequent trajectories. Using an infinite sequence of low-discrepancy sample points, the replication heuristic is turned into an adaptive consistent sampling arrangement. That is, computer graphics system 10 can fix the sampling rate $\Delta M$, compare current and previous estimates every $\Delta M$ samples, and, if the estimates differ by less than a predetermined threshold value, terminate sampling. The computer graphics system 10 can, in turn, determine the threshold value, by importance information, that is, how much the local integral contributes to the global integral.

As noted above, the integral described above in connection with equation (6) is over a finite time period T from $t_0$ to $t_0$+T, during which time the shutter of the simulated camera is open. During the time period, if an object in the scene moves, the moving object may preferably be depicted in the image as blurred, with the extent of blurring being a function of the object's motion and the time interval $t_0$+T. Generally, motion during the time an image is recorded is linearly approximated by motion vectors, in which case the integrand (equation (6)) is relatively smooth over the time the shutter is open and is suited for correlated sampling. For a ray instance "i," started at the subpixel position $x_i$, the offset $\Phi_3(i)$ into the time interval is generated and the $N_T$-1 subsequent samples $$\Phi_3(i) + \frac{j}{N_T} \mod 1 \text{ for } 0 < j < N_T \text{ that is}$$

$$t_{i,j} := t_0 + \left(\Phi_3(i) \oplus \frac{j}{N_T}\right) \cdot T. \quad (17)$$

Determining sample points in this manner fills the sampling space, resulting in a more rapid convergence to the value of the integral (equation (6)). For subsequent trajectory splitting, rays are decorrelated by setting the instance i'=i+j.

In addition to determining the position of the jittered subpixel sample point $x_i$, and adjusting the camera and scene according to the sample point $t_{i,j}$ for the time, the computer graphics system also simulates depth of field. In simulating depth of field, the camera to be simulated is assumed to be provided with a lens having known optical characteristics and, using geometrical optics, the subpixel sample point $x_i$ is mapped through the lens to yield a mapped point $x_i'$. The lens is sampled by mapping the dependent samples $$y_{i,j,k} = \left(\left(\Phi_5(i+j, \sigma_5) \oplus \frac{k}{N_L}\right), (\Phi_7(i+j, \sigma_7) \oplus \Phi_2(k))\right) \quad (18)$$

onto the lens area $A_L$ using a suitable one of a plurality of known transformations. Thereafter, a ray is shot from the sample point on the lens specified by $y_{i,j,k}$ through the point $x_i'$ into the scene. The offset ($\Phi_5(i+j,\sigma_5), \Phi_7(i+j, \sigma_7)$) in equation (18) comprise the next components taken from the generalized scrambled Hammersley point set, which, for trajectory splitting, is displaced by the elements $$\left(\frac{k}{N_L}, \Phi_2(k)\right)$$

of the two-dimensional Hammersley point set. The instance of the ray originating from sample point $y_{i,j,k}$ is set to "i+j+k" in order to decorrelate further splitting down the ray tree. In equation (18), the scrambled samples ($\Phi_5(i+j,\sigma_5),\Phi_7(i+j,\sigma_7)$) are used instead of the unscrambled samples of ($\Phi_5(i+j)$, $\Phi_7(i+j)$) since in bases "five" and "seven" the up to five unscrambled samples will lie on a straight line, which will not be the case for the scrambled samples.

In connection with determination of a value for the direct illumination ($T_{f_r-f_s}L_e$ above), direct illumination is represented as an integral over the surface of the scene $\partial V$, which integral is decomposed into a sum of integrals, each over one of the "L" single area light sources in the scene. The individual integrals in turn are evaluated by dependent sampling, that is $$(T_{f_r-f_s}L_e)(y,z) = \int_{\partial V} L_e(x,y)f_r(x,y,z)G(x,y)dx \qquad (19)$$

$$= \sum_{k=1}^{L} \int_{suppL_{e,k}} L_e(x,y)f_r(x,y,z)G(x,y)dx$$

$$\approx \sum_{k=1}^{L} \frac{1}{M_K} \sum_{j=0}^{M_k-1} L_e(x_j,y)f_r(x_j,y,z)G(x_j,y).$$

where $suppL_{e,k}$ refers to the surface of the respective "k-th" light source. In evaluating the estimate of the integral for the "k-th" light source, for the $M_k$-th query ray, shadow rays determine the fraction of visibility of the area light source, since the point visibility varies much more than the smooth shadow effect. For each light source, the emission $L_e$ is attenuated by a geometric term G, which includes the visibility, and the surface properties are given by a bidirectional distribution function $f_r$-$f_s$. These integrals are local integrals in the ray tree yielding the value of one node in the ray tree, and can be efficiently evaluated using dependent sampling. In dependent sampling, the query ray comes with the next free integral dimension "d" and the instance "i," from which the dependent samples are determined in accordance with $$x_j = \left(\Phi_{b_d}(i,\sigma_{b_d}) \oplus \frac{j}{M_k}, \Phi_{b_{d+1}}(i,\sigma_{b_{d+1}}) \oplus \Phi_2(j)\right). \qquad (20)$$

The offset $(\Phi_{b_d}(i,\sigma_{b_d}),\Phi_{b_{d+1}}(i,\sigma_{b_{d+1}}))$ again is taken from the corresponding generalized scrambled Hammersley point set, which shifts the two-dimensional Hammersley point set $$\left(\frac{j}{M_k}, \Phi_2(j)\right)$$

on the light source. Selecting the sample rate $M_k=2^{n_k}$ as a power of two, the local minima is obtained for the discrepancy of the Hammersley point set that perfectly stratifies the light source. As an alternative, the light source can be sampled using an arbitrarily-chosen number $M_k$ of sample points using $$\left(\frac{j}{M_k}, \Phi_{M_k}(j,\sigma_{M_k})\right)_{j=0}^{M_k-1}$$

as a replication rule. Due to the implicit stratification of the positions of the sample points as described above, the local convergence will be very smooth.

The glossy contribution $T_{f_e}(L-L_e)$ is determined in a manner similar to that described above in connection with area light sources (equations (19) and (20)), except that a model $f_g$ used to simulate glossy scattering will be used instead of the bidirectional distribution function $f_r$. In determining the glossy contribution, two-dimensional Hammersley points are generated for a fixed splitting rate M and shifted modulo "one" by the offset $(\Phi_{b_d}(i,\sigma_{b_d}),\Phi_{b_{d+1}}(i,\sigma_{b_{d+1}}))$ taken from the current ray tree depth given by the dimension field "d" of the incoming ray. The ray trees X spanned into the scattering direction are decorrelated by assigning the instance fields i'=i+j in a manner similar to that done for simulation of motion blur and depth of field, as described above. The estimates generated for all rays are averaged by the splitting rate "M" and propagated up the ray tree.

Volumetric effects are typically provided by performing a line integration along respective rays from their origins to the nearest surface point in the scene. In providing for a volumetric effect, the computer graphics system 10 generates from the ray data a corresponding offset $\Phi_{b_d}(i)$ which it then uses to shift the M equidistant samples on the unit interval seen as a one-dimensional torus. In doing so, the rendering time is reduced in comparison to use of an uncorrelated jittering methodology.

Global illumination includes a class of optical effects, such as indirect illumination, diffuse and glossy inter-reflections, caustics and color bleeding, that the computer graphics system 10 simulates in generating an image of objects in a scene. Simulation of global illumination typically involves the evaluation of a rendering equation. For the general form of an illustrative rendering equation useful in global illumination simulation, namely:

$$L(\vec{x},\vec{w}) = L_e(\vec{x},\vec{w}) + \int_{S'} f(\vec{x},\vec{w}' \to \vec{w})G(\vec{x},\vec{x}')V(\vec{x},\vec{x}')L(\vec{i},\vec{w}')dA' \qquad (21)$$

it is recognized that the light radiated at a particular point $\vec{x}$ in a scene is generally the sum of two components, namely, the amount of light (if any) that is emitted from the point and the amount of light (if any) that originates from all other points and which is reflected or otherwise scattered from the point $\vec{x}$. In equation (21), $L(\vec{x},\vec{w})$ represents the radiance at the point x in the direction $\vec{w}=(\theta,\phi)$ (where "θ" represents the angle of direction $\vec{w}$ relative to a direction orthogonal of the surface of the object in the scene containing the point $\vec{x}$, and "φ" represents the angle of the it component of direction $\vec{w}$ in a plane tangential to the point $\vec{x}$). Similarly, $L(\vec{x}',\vec{w}')$ in the integral represents the radiance at the point $\vec{x}'$ in the direction $\vec{w}'=(\theta',\phi')$ (where "θ'" represents the angle of direction $\vec{w}'$ relative to a direction orthogonal of the surface of the object in the scene containing the point $\vec{x}'$, and "φ'" represents the angle of the component of direction $\vec{w}'$ in a plane tangential to the point $\vec{x}'$), and represents the light, if any, that is emitted from point $\vec{x}'$ which may be reflected or otherwise scattered from point $\vec{x}$.

Continuing with equation (21), $L_e(\vec{x},\vec{w})$ represents the first component of the sum, namely, the radiance due to emission from the point $\vec{x}$ in the direction $\vec{w}$, and the integral over the sphere S' represents the second component, namely, the radiance due to scattering of light at point $\vec{x}$. $f(\vec{x},\vec{w}' \to \vec{w})$ is a bidirectional scattering distribution function which describes how much of the light coming from direction $\vec{w}'$ is reflected, refracted or otherwise scattered in the direction $\vec{w}$, and is generally the sum of a diffuse component, a glossy component and a specular component. In equation (21), the function $G(\vec{x},\vec{x}')$ is a geometric term $$G(\vec{x}, \vec{x}') = \frac{\cos\theta\cos\theta'}{|\vec{x} - \vec{x}'|^2} \quad (22)$$

where $\theta$ and $\theta'$ are angles relative to the normals of the respective surfaces at points $\vec{x}$ and $\vec{x}'$, respectively. Further in equation (21), $V(\vec{x}, \vec{x}')$ is a visibility function which equals the value one if the point $\vec{x}'$ is visible from the point x and zero if the point $\vec{x}'$ is not visible from the point $\vec{x}'$.

The computer graphics system 10 makes use of global illumination specifically in connection with determination of the diffuse component $T_{f_d}T_{f_d}L$ and the caustic component $T_{f_d}T_{f_g+f_s}L$ using a photon map technique. Generally, a photon map is constructed by simulating the emission of photons by light source(s) in the scene and tracing the path of each of the photons. For each simulated photon that strikes a surface of an object in the scene, information concerning the simulated photon is stored in a data structure referred to as a photon map, including, for example, the simulated photon's color, position and direction angle. Thereafter a Russian roulette operation is performed to determine the photon's state, that is, whether the simulated photon will be deemed to have been absorbed or reflected by the surface. If a simulated photon is deemed to have been reflected by the surface, the simulated photon's direction is determined using, for example, a bidirectional reflectance distribution function ("BRDF"). If the reflected simulated photon strikes another surface, these operations will be repeated (reference the aforementioned Grabenstein application). The data structure in which information for the various simulated photons is stored may have any convenient form; typically k-dimensional trees, for "k" an integer" are used. After the photon map has been generated, it can be used in rendering the respective components of the image.

In generating a photon map, the computer graphics system 10 simulates photons trajectories, thus avoiding the necessity of discretizing the kernel of the underlying integral equation. The interactions of the photons with the scene, as described above, are stored and used for density estimation. The computer graphics system 10 makes use of a scrambled Halton sequence, which has better discrepancy properties in higher dimensions than does an unscrambled Halton sequence. The scrambled Halton sequence also has the benefit, over a random sequence, that the approximation error decreases more smoothly, which will allow for use of an adaptive termination scheme during generation of the estimate of the integral. In addition, since the scrambled Halton sequence is strictly deterministic, generation of estimates can readily be parallelized by assigning certain segments of the low-discrepancy sequence to ones of a plurality of processors, which can operate on portions of the computation independently and in parallel. Since usually the space in which photons will be shot by selecting directions will be much larger than the area of the light sources from which the photons were initially shot, it is advantageous to make use of components of smaller discrepancy, for example, $\Phi_2$ or $\Phi_3$ (where, as above, $\Phi_b$ refers to the radical inverse function for base "b"), for angular scattering and components of higher discrepancy, for example, $\Phi_5$ or $\Phi_7$ for area sampling, which will facilitate filling the space more uniformly.

The computer graphics system 10 estimates the radiance from the photons in accordance with $$\bar{L}_r(x,\omega) \approx \frac{1}{A} \sum_{i \in B_k(x)} f_r(\omega_i, x, \omega)\Phi_i \quad (23)$$

where, in equation (23), $\Phi_i$ represents the energy of the respective "i-th" photon, $\omega_i$ is the direction of incidence of the "i-th photon," $B_k(x)$ represents the set of the "k" nearest photons around the point "x," and "A" represents an area around point "x" that includes the photons in the set $B_k(x)$. The computer graphics system 10 makes use of an unbiased but consistent estimator is used for , which is determined as follows. Taking the radius $r(B_k(x))$ of the query ball (what is this?**) a tangential disk D of radius $r(B_k(x))$ centered on the point x is divided into M equal-sized subdomains $D_i$, that is $$\bigcup_{i=0}^{M-1} D_i = D \text{ and } D_i \cap D_j \neq 0 \text{ for } i \neq j, \quad (24)$$

where $|D_i| = \frac{|D|}{M} = \frac{\pi r^2(B_k(x))}{M}$.

The set
$$P = \{D_i | D_i \cap \{x_i|_D | i \in B_k(x)\} \neq 0\} \quad (25)$$

contains all the subdomains $D_i$ that contain a point $x_i|_D$ on the disk, which is the position of the "i-th" photon projected onto the plane defined by the disk D along its direction of incidence $\omega_i$. Preferably, the number M of subdomains will be on the order of $\sqrt{k}$ and the angular subdivision will be finer than the radial subdivision in order to capture geometry borders. The actual area A is then determined by $$A = \pi r^2(B_k(x)) \frac{|P|}{M}. \quad (26)$$

Determining the actual coverage of the disk D by photons significantly improves the radiance estimate (equation (23)) in corners and on borders, where the area obtained by the standard estimate $\pi r^2(B_k(x))$ would be too small, which would be the case at corners, or too large, which would be the case at borders. In order to avoid blurring of sharp contours of caustics and shadows, the computer graphics system 10 sets the radiance estimate L to black if all domains $D_i$ that touch x do not contain any photons.

It will be appreciated that, in regions of high photon density, the "k" nearest photons may lead to a radius $r(B_k(x))$ that is nearly zero, which can cause an over-modulation of the estimate. Over-modulation can be avoided by selecting a minimum radius $r_{min}$, which will be used if $r(B_k(x))$ is less than $r_{min}$. In that case, instead of equation (23), the estimate is generated in accordance with $$\bar{L}_r(x,\omega) = \frac{N}{k} \sum_{i \in B_k(x)} \Phi_i f_r(\omega_i, x, \omega_r) \quad (27)$$

assuming each photon is started with 1/N of the total flux $\Phi$. The estimator in equation (27) provides an estimate for the mean flux of the "k" photons if $r(B_k(x)) < r_{min}$.

The global photon map is generally rather coarse and, as a result, subpixel samples can result in identical photon map queries. As a result, the direct visualization of the global photon map is blurry and it is advantageous to perform a smoothing operation in connection therewith In performing such an operation, the computer graphics system 10 performs a local pass integration that removes artifacts of the direct visualization. Accordingly, the computer graphics system 10 generates an approximation for the diffuse illumination term $T_{f_d}T_{f_d}L$ as $$T_{f_d}T_{f_d}L \approx (T_{f_d}\bar{L}_r)(x) = \int_{S^2(x)} f_d(x)\bar{L}_r(h(x,\vec{\omega}))\cos\theta d\omega \quad (28)$$

$$\approx \frac{f_d(x)}{M}\sum_{i=0}^{M-1}\bar{L}_r(h(x,\omega(\arcsin\sqrt{u_{i,1}},2\pi u_{i,2}))),$$

with the integral over the hemisphere $S^2(x)$ of incident directions aligned by the surface normal in "x" being evaluated using importance sampling. The computer graphics system 10 stratifies the sample points on a two-dimensional grid by applying dependent trajectory splitting with the Hammersley sequence and thereafter applies irradiance interpolation. Instead of storing the incident flux $\Phi_i$ of the respective photons, the computer graphics system 10 stores their reflected diffuse power $f_d(x_i)\Phi_i$ with the respective photons in the photon map, which allows for a more exact approximation than can be obtained by only sampling the diffuse BRDF in the hit points of the final gather rays. In addition, the BRDF evaluation is needed only once per photon, saving the evaluations during the final gathering. Instead of sampling the full grid, the computer graphics system 10 uses adaptive sampling, in which refinement is triggered by contrast, distance traveled by the final gather rays in order to more evenly sample the projected solid angle, and the number of photons that are incident form the portion of the projected hemisphere. The computer graphics system fills in positions in the grid that are not sampled by interpolation. The resulting image matrix of the projected hemisphere is median filtered in order to remove weak singularities, after which the approximation is generated. The computer graphics system 10 performs the same operation in connection with hemispherical sky illumination.

The computer graphics system 10 processes final gather rays that strike objects that do not cause caustics, such as plane glass windows, by recursive ray tracing. If the hit point of a final gather ray is closer to its origin than a predetermined threshold, the computer graphics system 10 also performs recursive ray tracing. This reduces the likelihood that blurry artifacts will appear in corners, which might otherwise occur since for close hit points the same photons would be collected, which can indirectly expose the blurry structure of the global photon map.

Generally, photon maps have been taken as a snapshot at one point in time, and thus were unsuitable in connection with rendering of motion blur. Following the observation that averaging the result of a plurality of photon maps is generally similar to querying one photon map with the total number of photons from all of the plurality of photon maps, the computer graphics system 10 generates $N_T$ photon maps, where $N_T$ is determined as described above, at points in time $$t_b = t_0 + \frac{b+\frac{1}{2}}{N_T}T, \quad (29)$$

for $0 \leq b < N_T$. During rendering, the computer graphics system 10 uses the photon map with the smallest time difference $|t_{i,j}-t_b|$ in connection with rendering for the time sample point $t_{i,j}$.

The invention provides a number of advantages. In particular, the invention provides a computer graphics system that makes use of strictly deterministic distributed ray tracing based on low-discrepancy sampling and dependent trajectory splitting in connection with rendering of an image of a scene. Generally, strictly deterministic distributed ray tracing based on low-discrepancy sampling and dependent trajectory splitting is simpler to implement than an implementation based on random or pseudo-random numbers. Due to the properties of the radical inversion function, stratification of sample points is intrinsic and does not need to be considered independently of the generation of the positions of the sample points. In addition, since the methodology is strictly deterministic, it can be readily parallelized by dividing the image into a plurality of tasks, which can be executed by a plurality of processors in parallel. There is no need to take a step of ensuring that positions of sample points are not correlated, which is generally necessary if a methodology based on random or pseudo-random numbers is to be implemented for processing in parallel.

Generally, a computer graphics system that makes use of low-discrepancy sampling in determination of sample points will perform better than a computer graphics system that makes use of random or pseudo-random sampling, but the performance may degrade to that of a system that makes use of random or pseudo-random sampling in higher dimensions. By providing that the computer graphics system performs dependent splitting by replication, the superior convergence of low-dimensional low-discrepancy sampling can be exploited with the effect that the overall integrand becomes smoother, resulting in better convergence than with stratified random or pseudo-random sampling. Since the computer graphics system also makes use of dependent trajectory sampling by means of infinite low discrepancy sequences, consistent adaptive sampling of, for example, light sources, can also be performed.

In addition, it will be appreciated that, although the computer graphics system has been described as making use of sample points generated using generalized scrambled and/or unscrambled Hammersley and Halton sequences, it will be appreciated that generally any (t,m,s)-net or (t,s)-sequence can be used.

Code Segment 1

The following is a code fragment in the C++ programming language for generating the positions of the jittered subpixel sample points $x_i$

```
unsigned short Period, *Sigma;
void InitSigma(int n)
{
unsigned short Inverse, Digit, Bits;
Period = 1 << n;
Sigma = new unsigned short [Period];
for (unsigned short i = 0; i < Period; i++)
{
```

-continued

```
        Digit = Period
        Inverse = 0;
        for (bits = i; bits; bits >>= 1)
        {
            Digit >>= 1;
            if (Bits & 1)
                inverse += Digit;
        }
        Sigma[i] = Inverse;
    }
}
void SampleSubpixel(unsigned int *i, double *x, double *y, int s_x, int s_y)
{
    int j = s_x & (Period − 1);
    int k = s_y & (Period − 1);
    *i = j * Period + Sigma[k]
    *x = (double) s_x + (double) Sigma[k] / (double) Period;
    *y = (double) s_y + (double) Sigma[j] / (double) Period;
}
```

Code Segment 2

The following is a code fragment in the C++ programming language for generating a ray tree

```
class Ray
{
    int i; //current instance of low discrepancy vector
    int d; //current integral dimension in ray tree
    ...
}
void Shade (Ray& Ray)
{
    Ray next_ray;
    int i = ray.i;
    int d = ray.d
    ...
    for (int j = 0;j < M;j++)
    {
        ...
        // ray set up for recursion
```

$$y = \left(\Phi_{b_d}(i, \sigma_{b_d}) \oplus \frac{j}{M}, \ldots, \Phi_{b_{d+\Delta d-1}}(i, \sigma_{b_{d+\Delta d-1}}) \oplus \Phi_{b_{d+\Delta d-2}}(i, \sigma_{b_{d+\Delta d-2}})\right)$$

```
        next_ray = SetUpRay(y); // determine ray parameters by y
        next_ray.i = i + j; // decorrelation by generalization
        next_ray.d = d + Δd; //dimension allocation
        Shade(next_ray);
        ...
    }
}
```

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

We claim:

1. A computer program product, comprising computer program instructions executable in a computer graphics system operable to generate one or more pixel values for a pixel in an image, the pixel being representative of a point in a scene as recorded on an image plane of a simulated camera, the image being displayable to a user via a display element in electrical communication with the computer, in response to display-controlling electrical signals generated by the computing element and communicated to the display element, the display-controlling electrical signals being generated by the computer based on the pixel values, the computer program instructions being executable by the computer graphics system to enable the computer graphics system to generate the pixel values for the image, the computer program product comprising a computer-readable physical medium having stored thereon:

A. computer-readable instructions executable by the computer graphics system to enable the computer graphics system to generate a set of sample points representing at least one simulated element of the simulated camera, the sample points representing elements of a Hammersley sequence, and B. computer-readable instructions executable by the computer graphics system to enable the computer graphics system to generate at least one value representing an evaluation of a selected function at one of the sample points, the value generated corresponding to the pixel value;

wherein the generating of sample points comprises generating sample position points $x_i$ representing jittered sample point positions on a subpixel grid for at least one pixel on the image plane for use by the computer graphics system in evaluating the selected function; and wherein sample position points $x_i$ are generated in accordance with $$x_i = (s_x + \Phi_2(k), s_y + \Phi_2(j))$$
$$= \left(s_x + \frac{\sigma(k)}{2^n}, s_y + \frac{\sigma(j)}{2^n}\right)$$

where $(s_x, s_y)$ are subpixel coordinates mapped onto strata coordinates $$(j,k) := (s_x \bmod 2^n, s_y \bmod 2^n),$$

and instance number "i" corresponds to $$i = j2^n + \sigma(k)$$

where integer permutation $$\sigma(k) := 2^n \Phi_2(k) \text{ for } 0 \leq k < 2^n$$

for "n" a selected integer, and $$\Phi_b(q)$$

is the radical inverse function of "q" in base "b".

2. A computer program product, comprising computer program instructions executable in a computer graphics system operable to generate one or more pixel values for a pixel in an image, the pixel being representative of a point in a scene as recorded on an image plane of a simulated camera, the image being displayable to a user via a display element in electrical communication with the computer, in response to display-controlling electrical signals generated by the computing element and communicated to the display element, the display-controlling electrical signals being generated by the computer based on the pixel values, the computer program instructions being executable by the computer graphics system to enable the computer graphics system to generate the pixel values for the image, the computer program product comprising a computer-readable physical medium having stored thereon:

A. computer-readable instructions executable by the computer graphics system to enable the computer graphics system to generate a set of sample points representing at least one simulated element of the simulated camera, the sample points representing elements of a Hammersley sequence; and B. computer-readable instructions executable by the computer graphics system to enable the computer graphics system to generate at least one value representing an evaluation of a selected function at one of the sample points, the value generated corresponding to the pixel value;

wherein the generating of sample points comprises generating sample position points $x_i$ representing jittered sample point positions on a subpixel grid for at least one pixel on the image plane for use by the computer graphics system in evaluating the selected function, wherein the simulated camera is to be provided with a shutter, and the computer-readable instructions executable by the computer graphics system to enable the computer graphics system to generate a set of sample points comprises computer-readable instructions executable by the computer graphics system to enable the computer graphics system to generate, for at least one sample point on a subpixel for at least one pixel on the image plane, sample time points $t_{i,j}$ representing "j" points in time during a time interval $t_0$ to $t_0+T$ during which the shutter is to be open tot use by the computer graphics system in evaluating the selected function; and wherein the generating of sample points comprises generating the sample time points $t_{i,j}$ in accordance with $$t_{i,j} := t_0 + \left(\Phi_3(i) \oplus \frac{j}{N_T}\right) \cdot T$$

where $N_T$ corresponds to a predetermined number of times at which sample time points $t_{i,j}$ are to be generated and $\Phi_b(q)$ is the radical inverse function of "q" in base "$b_l$".

3. A computer program product, comprising computer program instructions executable in a computer graphics system operable to generate one or more pixel values for a pixel in an image the pixel being representative of a point in a scene as recorded on an image plane of a simulated camera, the image being displayable to a user via a display element in electrical communication with the computer, in response to display-controlling electrical signals generated by the computing element and communicated to the display element, the display-controlling electrical signals being generated by the computer based on the pixel values, the computer program instructions being executable by the computer graphics system to enable the computer graphics system to generate the pixel values for the image, the computer program product comprising a computer-readable physical medium having stored thereon:

A. computer-readable instructions executable by the computer graphics system to enable the computer graphics system to generate a set of sample points representing at least one simulated element of the simulated camera, the sample points representing elements of a Hammersley sequence; and B. computer-readable instructions executable by the computer graphics system to enable the computer graphics system to generate at least one value representing an evaluation of a selected function at one of the sample points, the value generated corresponding to the pixel value;

wherein the generating of sample points comprises generating sample position points $x_i$ representing jittered sample point positions on a subpixel grid for at least one pixel on the image plane for use by the computer graphics system in evaluating the selected function;

wherein the simulated camera is to be provided with a shutter, and the generating of sample points comprises generating, for at least one sample point position on a subpixel for at least one pixel on the image plane, sample time points $t_{i,j}$ representing "j" points in time during a time interval $t_0$ to $t_0+T$ during which the shutter is to be open for use by the computer graphics system in evaluating the selected function;

wherein the simulated camera is to be provided with a lens, and the generating of sample points comprises generating, for at least one sample point position and at least one sample time point, sample lens position points $y_{i,j,k}$ representing "k" points on the lens for use by the computer graphics system in evaluating the selected function; and wherein the generating of sample points comprises generating the sample lens points in accordance with $$y_{i,j,k} = \left(\left(\Phi_5(i+j, \sigma_5) \oplus \frac{k}{N_6}\right), (\Phi_7(i+j, \sigma_7) \oplus \Phi_2(k))\right)$$

where $\Phi_b(q,\sigma)$ is the scrambled radical inverse function of "q" in base "b" and "$\oplus$" refers to addition modulo a predetermined value and instance number "i" corresponds to $i=j2^n+\sigma(k)$ where integer permutation $\sigma(k):=2^n\Phi_2(k)$ for $0 \leq k < 2^n$ for "n" a selected integer.

4. In a computer graphics system operable to generate a pixel value for a pixel in an image, the pixel being representative of a point in a scene as recorded on an image plane of a simulated camera, the image being displayable to a user via a display element in electrical communication with the computer, in response to display-controlling electrical signals generated by the computing element and communicated to the display element, the display-controlling electrical signals being generated by the computer based on the pixel values, the improvement comprising:

A. a sample point generator configured to generate a set of sample points representing at least one simulated element of the simulated camera, the sample points representing elements of Hammersley sequence; and B. a function evaluator configured to generate at least one value representing an evaluation of a selected function at one of the sample points generated by the sample point generator, the value generated by the function evaluator corresponding to the pixel value;

wherein the sample point generator is configured to generate sample position points $x_i$ representing jittered sample point positions on a subpixel grid for at least one pixel on the image plane for use by the function evaluator in evaluating the selected function; and wherein the sample point generator is configured to generate the sample position points $x_i$ n accordance with $$x_i = (s_x + \Phi_2(k), s_y + \Phi_2(j))$$
$$= \left(s_x + \frac{\sigma(k)}{2^n}, s_y + \frac{\sigma(j)}{2^n}\right)$$

where $(s_x, s_y)$ are subpixel coordinates mapped onto strata coordinates $$(j,k) := (s_x \bmod 2^n, s_y \bmod 2^n),$$

and instance number "i" corresponds to $$i = j2^n + \sigma(k)$$

where integer permutation $$\sigma(k) := 2^n \Phi_2(k) \text{ for } 0 \leq k < 2^n$$

for "n" a selected integer, and $$\Phi_{b_l}(q)$$

is the radical inverse function of "q" in base "$b_l$".

5. In a computer graphics system operable to generate a pixel value for a pixel in an image, the pixel being representative of a point in a scene as recorded on an image plane of a simulated camera, the image being displayable to a user via a display element in electrical communication with the computer, in response to display-controlling electrical signals generated by the computing element and communicated to the display element, the display-controlling electrical signals being generated by the computer based on the pixel values, the improvement comprising:

A. a sample point generator configured to generate a set of sample points representing at least one simulated element of the simulated camera, the sample points representing elements of a Hammerstey sequence; and B. a function evaluator configured to generate at least one value representing an evaluation of a selected function at one of the sample points generated by the sample point generator, the value generated by the function evaluator corresponding to the pixel value;

wherein the sample point generator is configured to generate sample position points $x_i$ representing jittered sample point positions on a subpixel grid for at least one pixel on the image plane for use by the function evaluator in evaluating the selected function;

wherein the simulated camera is to he provided with a shutter, and the sample point generator is configured to generate, for at least one sample point position on a subpixel for at least one pixel on the image plane, sample time points $t_{i,j}$ representing "j" points in time during a time interval $t_0$ to $t_0+T$ during which the shutter is to be open for use by the function evaluator in evaluating the selected function; and wherein the sample point generator is configured to generate the sample time points $t_{i,j}$ in accordance with $$t_{i,j} := t_0 + \left(\Phi_3(i) \oplus \frac{j}{N_T}\right) \cdot T$$

where $N_T$ corresponds to a predetermined number of times at which sample time points $t_{i,j}$ are to be generated and $$\Phi_{b_l}(q)$$

is the radical inverse function of "q" in base "$b_l$".

6. In a computer graphics system operable to generate a pixel value for a pixel in an image, the pixel being representative of a point in a scene as recorded on an image plane of a simulated camera, the image being displayable to a user via a display element in electrical communication with the computer, in response to display-controlling electrical signals generated by the computing element and communicated to the display element, the display-controlling electrical signals being generated by the computer based on the pixel values, the improvement comprising:

A. a sample point generator configured to generate a set of sample points representing at least one simulated element of the simulated camera, the sample points representing elements Hammersley sequence; and B. a function evaluator configured to generate at least one value representing an evaluation of a selected function at one of the sample points generated by the sample point generator, the value generated by the function evaluator corresponding to the pixel value;

wherein the sample point generator is configured to generate sample position points $x_i$ representing jittered sample point positions on a subpixel grid for at least one pixel on the image plane for use by the function evaluator in evaluating the selected function;

wherein the simulated camera is to be provided with a shutter, and the sample point generator is con figured to generate, for at least one sample point position on a subpixel for at least one pixel on the image plane, sample time points $t_{i,j}$ representing "j" points in time during a time interval $t_0$ to $t_0+T$ during which the shutter is to be open for use by the function evaluator in evaluating the selected function;

wherein the simulated camera is to be provided with a lens, and the sample point generator is configured to generate for at least one sample point position and at least one sample time point, sample lens position points $Y_{i,j,K}$ representing "k" points on the lens for use by the function evaluator in evaluating the selected function; and wherein the sample point generator is configured to generate the sample lens points in accordance with $$y_{i,j,k} = \left(\left(\Phi_5(i+j, \sigma_5) \oplus \frac{k}{N_L}\right), (\Phi_7(i+j, \sigma_7) \oplus \Phi_2(k))\right)$$

where $$\Phi_{b_l}(q, \sigma)$$

is the scrambled radical inverse function of "q" in base "b" and "$\oplus$" refers to addition modulo a predetermined value and instance number "i" corresponds to $$i = j2^n + \sigma(k)$$

where integer permutation $$\sigma(k) := 2^n \Phi_2(k) \text{ for } 0 \leq k < 2^n$$

for "n" a selected integer.

* * * * *